United States Patent

Ingram

[15] 3,697,937
[45] Oct. 10, 1972

[54] ACOUSTIC REFLECTION COEFFICIENT LOGGING

[72] Inventor: John D. Ingram, Houston, Tex.

[73] Assignee: Schlumberger Technology Corporation, New York, N.Y.

[22] Filed: July 9, 1969

[21] Appl. No.: 840,179

[52] U.S. Cl.............................340/15.5 A, 181/.5 AC
[51] Int. Cl. ................................................G01v 1/22
[58] Field of Search ..........................181/.5; 340/15.5

[56] References Cited

UNITED STATES PATENTS

| | | | |
|---|---|---|---|
| 3,136,381 | 6/1964 | Anderson | 181/.5 |
| 3,215,934 | 11/1965 | Sallen | 324/77 |
| 3,292,143 | 12/1966 | Russell | 340/15.5 |
| 3,308,426 | 3/1967 | Wilson | 340/18 |
| 3,311,876 | 3/1967 | Lee | 340/18 |
| 3,454,924 | 7/1969 | Sherwood et al. | 340/15.5 |

FOREIGN PATENTS OR APPLICATIONS

| | | | |
|---|---|---|---|
| 793,617 | 7/1966 | Canada | 340/13 |
| 755,273 | 3/1967 | Canada | 340/9 |

*Primary Examiner*—Benjamin A. Borchelt
*Assistant Examiner*—N. Moskowitz
*Attorney*—Ernest R. Archambeau, Jr., Stewart F. Moore, David L. Moseley, Edward M. Roney and William R. Sherman

[57] ABSTRACT

An illustrative embodiment of the present invention includes method and apparatus for performing acoustic reflection coefficient logging in a well borehole. An acoustic well logging tool having at least a pair of biradially mounted receivers disposed in a zero spacing configuration and each comprising a plurality of arcuate segments disposed in a one-to-one relationship with each other is moved through the well bore. The electrical outputs of corresponding receiver segment pairs are processed to extract their relative amplitude and phase at a plurality of frequencies over the acoustic spectrum. The amplitude and phase data are used to compute the acoustic reflection coefficient exactly at the said plurality of frequencies over the acoustic spectrum thereby providing a frequency spectrum of acoustic reflection coefficients as measured at each of the paired biradially mounted receiver segments at each borehole depth. Such acoustic reflection coefficient spectra may be utilized, among other things, for evaluating cement conditions in the well bore.

25 Claims, 13 Drawing Figures

PATENTED OCT 10 1972 3,697,937

John D. Ingram
INVENTOR

BY *William J Beard*

ATTORNEY

John D. Ingram
INVENTOR

BY William J. Beard
ATTORNEY

PATENTED OCT 10 1972 3,697,937

John D. INGRAM
INVENTOR

BY William J. Beard
ATTORNEY

FIG. 9

John D. Ingram
INVENTOR

FIG. 10

ACOUSTIC REFLECTION COEFFICIENT LOGGING

In a well completion, the string of casing or pipe is set in a well bore and cement is forced into the annulus between the casing and the well bore primarily to separate oil and gas producing horizons from each other and from water bearing strata. Obviously, if the cementing fails to provide a separation of one zone from another, then fluids under pressure from one zone may be able to migrate and contaminate an otherwise productive nearby zone. Migration of water in particular produces undesirable water cutting of a producing zone and possibly can make a well con-commercial.

It is difficult to obtain an accurate picture of conditions behind a casing because of the difficulty of propagating signals through the metal casing wall. Various prior proposals to determine a separation effectiveness (i.e., the blocking or sealing characteristics) of the cement behind the casing have not been entirely successful in determining the effective presence of cement in the annulus between the casing and the formation. Further, it has not been possible to measure reliably the quality of the cement bond or seal between the casing and the cement and the quality of the cement bond or seal between the cement and the formation using the methods of the various prior proposals.

The mere presence or absence of cement in the annulus between the casing and the formation is valuable, but incomplete information. While cement may be present in the annulus, channels or inadequate sealing may still permit fluid communication between adjacent formations.

Use of the term "bond" in connection with the relationship of cement to the casing or the formation is somewhat vague, since adherence along the entire boundary between the casing and the cement or between the cement and the formation is not necessary to prevent fluid communication between adjacent porous zones. All that is necessary of a bond is that the relationship prevents the migration of fluids. Hereafter, reference to "bond" will mean that the separation of zones by cement is adequate to prevent fluid migration between the zones.

Several prior developments for obtaining the measure of the quality of a cement bond relative to the casing have been disclosed in U.S. Pat. Nos. 3,291,247; 3,291,248; and 3,292,246. These patents are all assigned to the assignee of the present invention. These systems have generally utilized acoustic principles where an acoustic signal is transmitted between a transmitter and a receiver. The amplitude of the early arrival signal (this early arrival is the casing signal since the acoustic impulse generally travels faster in the casing than in the surrounding cement of formation) at the receiver is measured as a determination of the quality of the adherence of cement to the casing. If a good contact existed between the cement and casing the casing signal would be expected to be attenuated because of the energy dissipated from the casing to the cement and the surrounding formations. Whereas, if no contact, or a poor bond existed the casing signal would be relatively unattenuated. This procedure is sound enough, if a good cement-casing contact exists but where a small space or annulus (sometimes called a micro-annulus) exists between the casing and the cement, such a measurement can give an indication of a poor cement job when the cement is actually adequate. By adequate, it is meant that the micro-annulus even though present does not permit fluid communication between adjacent porous formations. Moreover, such false indications of poor bonding can easily be the case because of the manner in which a cement job is performed.

In a primary cementing operation, cement is forced up the annulus about the casing by relatively high pressure applied inside the casing. This pressure tends to expand the casing. The pressure is maintained in the casing while the cement is setting. Once the cement is set, the pressure is then released. Upon release of the pressure the casing can contract, thus forming a micro-annulus between the set cement and the casing.

A more refined technique for determining the quality of cement in the annulus between the casing and the formations is disclosed in U.S. Pat. No. 3,401,773 entitled, "Method and Apparatus for Cement Logging of Cased Boreholes" by Judson D. Synnott,III which is assigned to the assignee of the present invention. In this technique, the amplitude of a reverberated early (casing) signal arrival is recorded and additionally, the total energy of a selected later portion of the sonic signal is obtained by integration to provide a second indication of the quality or integrity of the cement column. Even in the absence of a weak casing arrival, the additional step of observing the total energy obtained by integrating a later portion of the signal in this manner can confirm the presence of cement in the casing-formation annulus. Details of related methods may also be had by reference to U.S. Pat. No. 3,401,772 entitled, "Method for Logging Cased Boreholes" by Frank P. Kokesh, which is assigned to the assignee of the present invention.

While the foregoing methods and apparatus provide very useful information, it is desirable to more precisely determine the quality of the cement bond. For example, the energy content of the acoustic logging signals arriving at the receiver may depend on other factors than the cement bond to the casing or the integrity of the cement column, (sometimes called cement quality). Factors which can influence acoustic energy are: the formation hardness; eccentering of the acoustic logging tool; construction materials of which the acoustic logging sonde is made; type of casing; and the diameter of the borehole and the casing as well as their shape or geometry.

The recognition of these difficulties and some anomalous results in the various prior proposals has led to the development of the method and apparatus of the present invention which can provide a log of the reflection coefficients which may be used to determine the cement effectiveness under a range of well conditions. This result has been accomplished by the use of a quantative theoretical model of the cement problem coupled with analysis of the theoretical results and comparison of these results with acoustic logs taken from wells in the field.

Accordingly, it is an object of the present invention to provide a novel method and apparatus for determining exactly the acoustic reflection coefficient spectrum which may be used for determining cementing effectiveness in a cased borehole.

It is a further object of the present invention to provide a method and apparatus for cement evaluation in a cased borehole which derives the cementing effectiveness by the evaluation of the reflection coefficient associated with the radial propagation of acoustic energy is the sonde-well-bore-casing-annulus-formation system.

Another object of the present invention is to provide a method and apparatus for directly and exactly measuring the acoustic reflection coefficient in the mud column inside of a cased borehole.

A yet further object of the present invention is to provide a novel acoustic logging apparatus which may be utilized to directly measure the relative amplitude and phase of acoustic waves at two different radii within a cased borehole and to utilize this data to compute the acoustic reflection coefficient in the mud inside the casing in order to determine the cementing effectiveness.

Briefly, in accordance with the objects of the present invention, methods and apparatus for evaluating the cement conditions in cased boreholes are provided. Novel acoustic logging apparatus is provided including an acoustic transmitter together with a plurality of associated segmented acoustic receiver pairs. The receiver pairs are used in a zero spacing configuration and are mounted in a biradial manner. The biradial mounting and zero spacing configuration permits amplitude and relative phase measurements to be made on reflected radial acoustic energy emanating from the acoustic transmitter and reflected from material discontinuties in the system. These measurements may then be used to compute the acoustic reflection coefficient spectrum of the sonde-well-bore-casing-annulus-formation system directly. A novel computer apparatus for performing the computations necessary to extract the acoustic reflection coefficients from the measurements is disclosed along with means to display the frequency spectrum of the acoustic reflection coefficients as a function of borehole depth.

The novel features of the present invention are set forth with particularity in the appended claims. The operation together with further objects and advantages of the invention may be best understood by way of illustration and examples of certain embodiments when taken in conjunction with the accompanying drawings.

In a copending patent application entitled, "Cement Evaluation Logging" by J. H. Moran et al., Ser. No. 840,290, filed July 9, 1969 which is assigned to the assignee of the present invention, there is described method and apparatus for cement evaluation logging which is based on the concept of examining certain parameters associated with the characteristic frequencies, radial modes or resonances of the well-bore-casing-annulus-formation system. In the present invention this concept is also utilized. The method and apparatus of the present invention are directed to determining the cement conditions in cased boreholes by the logging of what may be referred to as the acoustic reflection coefficient frequency spectra of the system. The reflection coefficients are complex mathematical functions which will be subsequently described. The reflection coefficients are determined by comparing the relative amplitude and phase of reflected sonic energy impinging upon paired, biradially mounted, segmented, acoustic receiving transducers at a plurality of frequencies. Once the acoustic reflection coefficients are determined, principles of the present invention may be utilized to determine the cementing effectiveness in the casing-formation annulus from the log of the reflection coefficients.

Figure 1:
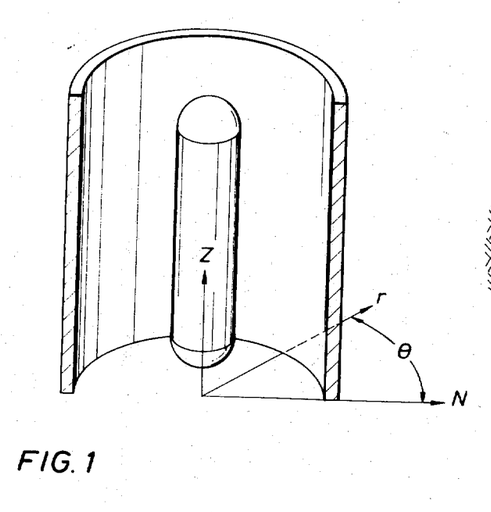
FIG. 1 is a schematic three dimensional view illustrating the cylindrical geometry of the sonde-borehole-casing system.

Using the cylindrical coordinate system illustrated in FIG. 1, having cylindrical coordinates $r$, $\theta$ and $z$, the displacements of particles of the various media in the system when excited by accoustic energy can be denoted by the functions $U_r$, $U_\theta$ and $U_z$. Considering the case of cylindrical symmetry, in which the motion is uniform in all $\theta$, and the $z$ dependence may be ignored, (as discussed in the above referenced copending Moran et al. patent application, this is valid near the characteristic frequencies or modes of the system) only the $r$ dependent motion need be considered. This type of motion can be written in terms of a scalar potential function $\phi$ defined by $$U_r = \partial\phi/\partial r$$

The wave equation for the $r$ dependent motion is then $$\frac{1}{c^2}\frac{\delta^2\phi}{\delta t^2} = \frac{\delta^2\phi}{\delta r^2} + \frac{1}{r}\frac{\delta\phi}{\delta r} \qquad (1)$$

Where $c$ is the speed of compressional waves in the system. This equation is derived from well-known physical principles and may, for example, be found by reference to *Elastic Waves in Layered Media*, by Ewing, Jardetsky and Press, published by the McGraw Hill Company of New York, 1957 Edition.

The scalar potential function $\phi$ is, of course, time dependent as well as dependent on $r$, [i.e., $\phi = \phi(r,t)$]. However, the time dependence may be taken to be that of a travelling wave [i.e., $\phi(r,t) = F(r) e^{i\omega t}$] where $\omega = 2\pi f$, is the angular frequency of the wave motion of frequency $f$. Using this relation, Equation (1) can be brought into the form $$-\frac{\omega^2}{c^2} F = \frac{\delta^2 F}{\delta r^2} + \frac{1}{r} \frac{\delta F}{\delta r} \qquad (2)$$

Equation (2) is recognized as a form of Bessel's equation having a general solution which may be written in the form $$F(r) = A H_0^{(1)}(kr) + B H_0^{(2)}(kr) \qquad (2a)$$

Here $k = \omega/c$ is the wave number of the waves. $H_0^{(1)}(kr)$ and $H_0^{(2)}(kr)$ are called Hankel functions of the first and second kind, zero order. The coefficients A and B may be thought of as the complex amplitudes of incoming and outgoing waves respectively, the A's being the amplitude of incoming waves and the B's as the amplitude of outgoing waves.

Recalling the definition of the displacement $U_r$ in terms of the potential function $\phi$ (the time dependent exponential function being dropped since it is merely a phase factor which does not influence the amplitude of the waves) the displacement may be written $$U_r = a\phi/ar = k A H_1^{(1)}(kr) - kBH_1^{(2)}(kr) \qquad (3)$$

where $H_1^{(1)}(kr)$ and $H_1^{(2)}(kr)$ are Hankel functions of the first and second kind, first order and again $k = \omega/c$ is the wave number.

The radial or normal stress (which is equal to the pressure in the medium, if the medium is a fluid) may also be written in terms of the solution of Equation (1). The stress $\tau(r)$ is defined as $$\tau_{(r)} = (\lambda + 2\mu) \frac{\partial^2 \phi}{\partial r^2} + \frac{\lambda}{r} \frac{\partial \phi}{\partial r} \qquad (4)$$

where $\lambda$ and $\mu$ are the Lamé constants which define the elastic properties of an isotropic solid. These constants are related to the compressional $C_D$ and shear $C_T$ wave velocities in a solid by the following equations $$C_D = \sqrt{\frac{\lambda + 2\mu}{\rho}} \qquad (5)$$

$$C_T = \sqrt{\mu/\rho} \qquad (6)$$

where $\rho$ is the density of the material. Using these relations the stress may be written as $$\tau_{(r)} = A \left[ \frac{k}{r} 2\mu H_1^{(1)}(kr) - k^2(\lambda + 2\mu) H_0^{(1)}(kr) \right]$$
$$+ B \left[ \frac{k}{r} 2\mu H_1^{(2)}(kr) - k^2(\lambda + 2\mu) H_0^{(2)}(kr) \right] \qquad (7)$$

The general solution (Equation 2a) above is valid in each of the several layers. This solution may now be adapted to the case of a particular problem of interest such as the cement evaluation problem. This may be accomplished by applying the boundary conditions of the problem at hand to determine the complex coefficients A and B.

Figure 2:
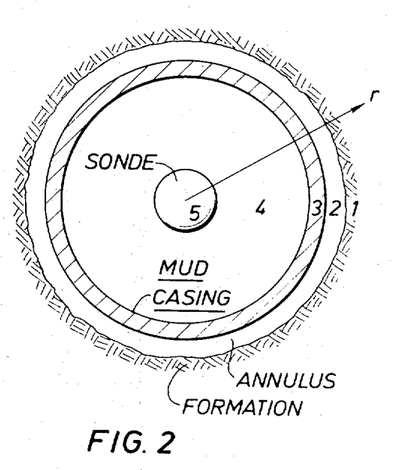
FIG. 2 is a schematic cross section view illustrating the cylindrical layers of the system of FIG. 1.

First (referring to FIG. 2) there are five layers (numbers 1–5) involved in the cement evaluation problem. While the general solution is valid in each layer, the coefficients $A$ and $B$ will be different in each layer. These may be referred to as $A_n$ and $B_n$ for their respective layers. In general if $n$ is the number of layers there will be $2n$ unknown complex coefficients to determine by applying the boundary conditions. Two boundary conditions which may be applied are 1. The displacement $U_r$ is continuous at the boundaries between each of the layers, i.e., $$U_{r1} = U_{r2} \text{ at } r_1 = r_2$$

$$U_{r2} = U_{r3} \text{ at } r_2 = r_3 \text{ etc.}$$

2. The normal stress $\tau$ is continuous at the boundaries between each of the layers, i.e., $$\tau_{r1} = \tau_{r2} \text{ at } r_1 = r_2$$

$$\tau_{r2} = \tau_{r3} \text{ at } r_2 = r_3 \text{ etc.}$$

Since there are $n-1$ boundaries between $n$ layers of material the two boundary conditions will furnish $2(n-1)$ or $2n-2$ equations in the $2n$ coefficients. Hence, two further boundary conditions must be imposed on the system to obtain a complete solution. These are supplied in the following manner.

In the outer layer (the formation layer 1) there is no further outer boundary to reflect waves. Hence the coefficient $A_1$ for the outer layer must be zero (i.e., since the $A$'s may be thought of as the amplitudes of incoming waves). Also, inside the sonde (layer 5) it is impossible to distinguish incoming from outgoing waves at the origin of the coordinate system since, as the waves pass through the origin, they change from incoming waves to outgoing waves. This means that the coefficient $A_5$ must equal $B_5$. These two extra boundary conditions provide the needed $2n$ equations which may be solved for the $2n$ unknown complex coefficients $A$ and $B$.

Finally, to complete the solution of the $2n$ equations for the $A$'s and $B$'s an account of the acoustic energy source used to excite the fluid must be provided. This represents the acoustic signal coming from the sonde and can have a frequency response comparable to that of typical acoustic logging transducers. This source function can be a function of displacement which is added to the boundary condition for displacement at the sonde-mud (i.e., layer 4–5 of FIG. 2) interface. A function of the form $$S(\omega) = \frac{-2\alpha_2(\alpha_1 - i\omega)}{[(\alpha_1 - i\omega)^2 - \alpha_2^2]^2} \times 1000 \qquad (8)$$

in which $\alpha_1$ and $\alpha_2$ are adjustable constants, can be used. If $\alpha_1 = 120/\pi$ and $\alpha_2 = 120$ this gives a source function whose peak is at 19KHz with a half width of about 13KHz, typical of acoustic logging transducers in present use.

With these boundary conditions, the $2n$ simultaneous equations for the coefficients $A_n$ and $B_n$ can be solved and various properties of the system which may be of interest can be observed. For example, one quantity, the ratio $A_4/B_4$ has been found to be of particular interest in evaluating cement conditions in the annulus between the casing and the formation. This quantity represents the ratio of the amplitudes of incoming to outgoing waves in the mud inside the casing. Such a quantity is accessible to measurement and may be thought of as a reflection coefficient which indicates how much acoustic energy escapes in the radial direction from the system into the formation.

Figure 3:
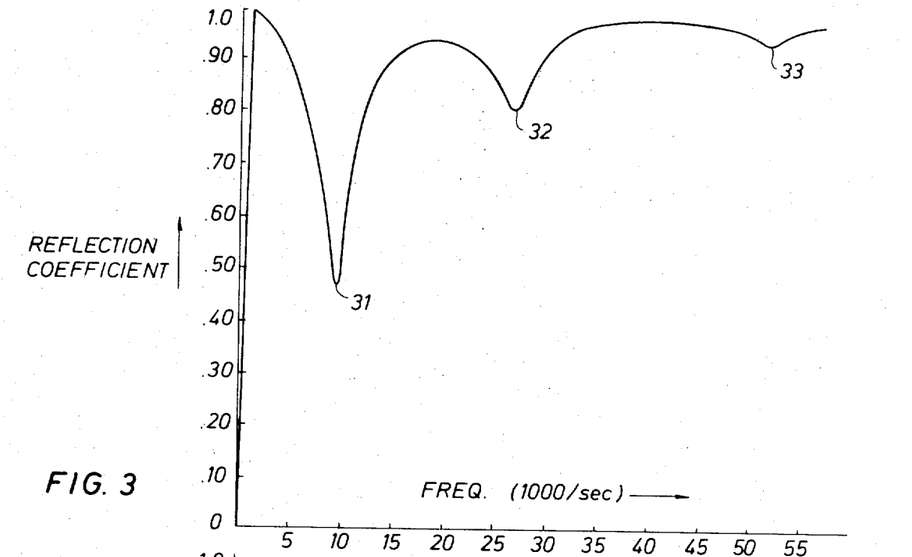
FIG. 3 is a typical curve of the reflection coefficient frequency spectrum of a system.

FIG. 3 shows a representative reflection coefficient curve. The reflection coefficient Q is plotted vs. frequency for the values given in Table I. A value of reflection coefficient near 1 indicates very little energy escaping radially into the formation. Lower values indicate more energy escaping into the formation at a particular frequency. The first minimum 31 of FIG. 3 is due to a transmission resonance of the casing-annulus system at about 9KHz. The second minimum 32 is due to a transmission resonance of the annulus itself at about 27KHz. This frequency corresponds to a wavelength which is equal to twice the annulus width. Other minima such as 33 appear at "harmonics" of this latter frequency for the wavelengths $2\,l/n\ n = 1, 2$, etc., where $l$ is the annulus width. An approximate expression for these frequencies is:

$$f_n = (nc)/(2l) \quad n = 1, 2 \text{---}$$

where $c$ is the speed of sound (compressional) in the annulus. From this it is apparent that if the annulus material is changed (i.e., cement or no cement) that the frequencies of the reflection coefficient minima are correspondingly changed.

TABLE I

| | |
|---|---|
| Casing Outer Diameter | 7 ⅝ inches |
| Casing Thickness | .32 inches |
| Borehole Diameter | 10 inches |
| Formation Compressional Wave Travel Time | 100 μ SEC/FT |
| Uncemented (Fluid-Filled) Annulus | |

Figure 4:
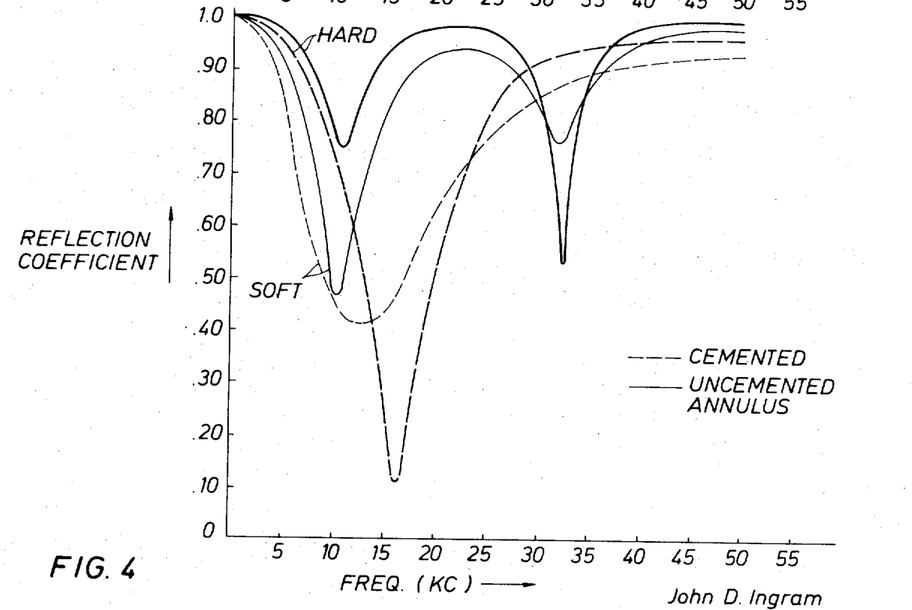
FIG. 4 is a reflection coefficient frequency spectrum showing the variance of the reflection coefficient with formation type and cement or no cement in the annulus.

The graphs of FIG. 4 clearly illustrate this point. The graphs are for the borehole parameters of Table II for both uncemented annulus and cemented annulus, bounded by both hard and soft formations. The graphs of FIG. 4 show that the

TABLE II

| | |
|---|---|
| Casing Outer Diameter | 6 inches |
| Casing Thickness | .25 inches |
| Borehole Diameter | 8 inches |
| Formation Compressional Travel Time | (soft) 100 μ SEC/FT |
| | (hard) 50 μ SEC/FT | reflection coefficients curves have great differences between the cemented and uncemented cases, particularly in the frequency range just above the first minimum of the curves (i.e., from 15KHz to 20KHz). These differences have been found to appear independently of the spacing between the acoustic transmitter and receiver on the sonde and over a wide range of small annulus (micro-annulus) sizes between the casing and the cement. A quantative measure of these differences can be made which would be an accurate indicator of cement conditions in the annulus. The method and apparatus to be discussed are intended to make just such a measurement.

Figure 5:
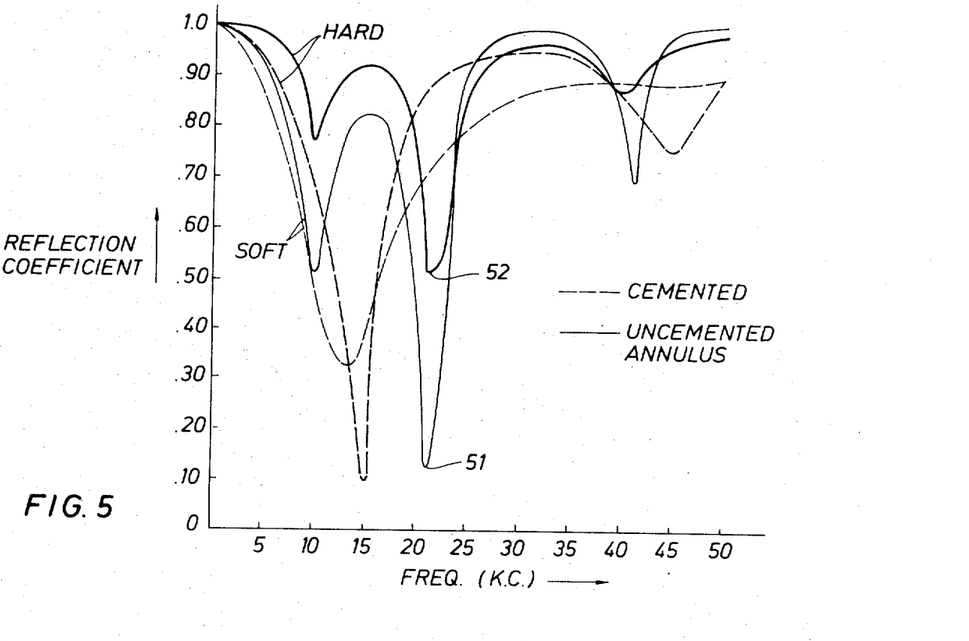
FIG. 5 shows multiple reflection coefficient frequency spectra for larger annuli than those of FIG. 4.

If only the frequency range just above the first minimum in the reflection coefficient curve is used, however, the results may not be reliable. This is due to the additional effect illustrated in FIG. 5. The graphs of FIG. 5 correspond to the parameters given in Table III.

TABLE III

| | |
|---|---|
| Casing Outer Diameter | 6 inches |
| Casing Thickness | .25 inches |
| Borehole Diameter | 9 inches |
| Formation Compressional Travel Time | (hard) 50 μ SEC/FT |
| | (soft) 100 μ SEC/FT |

These graphs illustrate the effect of larger annulus widths on the reflection coefficient curves for cemented and uncemented conditions. As may be appreciated from these plots, for the larger annulus width the second minimum for the uncemented case (51 + 52 on FIG. 5) is shifted lower in frequency and, in general, tends to produce anomalous results in the frequency range 20 to 25 KHz. That is, contrary to the general trend, the uncemented conditions generally result in lower reflection coefficients than those corresponding to the cemented conditions in this frequency range. For still larger annulus widths than those of the cases illustrated in FIG. 5, the third and higher minima can intrude into the low frequency range and further disturb the results expected from curves such as those of FIG. 4. Since the annulus width may not be accurately known in all cases of actual well bores (i.e., generally the annulus width at a location will not be known unless a caliper is run prior to the setting of the casing and even then the cementing process can change the borehole diameter due to washouts or the like) some means must be provided to measure the cement in the annulus which is independent of the annulus width.

From the above discussion it will be appreciated that it would not be desirable to rely on one measurement of the minima of the reflection coefficient curve for a system to establish the cementing effectiveness. A proposal to measure a quantity which is proportional to the reflection coefficient in three relatively wide frequency bands in order to avoid the above-mentioned anomaly is described in a copending application entitled, "Cement Evaluation Logging Utilizing Reflection Coefficients" Ser. No. 840,335, filed July 9, 1969 by Ralph G. Biel, which is assigned to the assignee of the present invention. The present invention, however, proposes to evaluate the cementing effectiveness by logging the reflection coefficients at a multiplicity of frequencies over the acoustic spectrum at each selected borehole depth. The resulting reflection coefficient frequency spectra may then be utilized to determine cementing effectiveness.

Recalling Equation (7) for the radial stress and taking into account that in the fluid inside the casing that the stress is equal to the pressure and that Lame' constant $\mu$ equals zero for such a fluid, the pressure at the boundary of an angularly segmented receiving transducer in the mud inside the casing may be written as a function of frequency as $$Pli(\omega) = Ai(\omega) H_0^{(1)}(Kre) + Bi(\omega)H_0^{(2)}(Kre) \quad (9)$$

Here, $l = 1, 2$—denotes the particular receiver in question, $i$ represents the $i$th angular segment of that receiver, $r_l$ is the radius of the $i$th receiver and $H_0^{(1)}(kr_l)$ and $H_0^{(2)}(kr_l)$ are again the Hankel function of the first and second kinds, zero order. Also, $\omega = 2\pi f$ is again the angular frequency of the waves and $k = \omega/c$ is, again, the wave number of the waves. The functions $A_i(\omega)$ and $B_i(\omega)$ are complex coefficients (functions of the frequency, $\omega$) differing only by a multiplicative constant $(L = -k^2\lambda)$ from the $A$'s and $B$'s previously discussed.

Solving Equation (9) for the $A$'s and $B$'s and taking the ratio of these at two receivers of different radii $r_1$ and $r_2$ (here the multiplicative factors $L = -k^2\lambda$ cancel making the $A$'s and $B$'s the same as previously discussed) the acoustic reflection coefficient $Q = B/A$ may be written exactly as $$Q_i = \frac{[P_{1i}H_0^{(2)}(kr_2) - P_{2i}H_0^{(2)}(kr_1)]}{[P_{2i}H_0^{(1)}(kr_1) - P_{1i}H_0^{(1)}(kr_2)]} \quad (10)$$

Equation (10) may be brought into a more convenient form for use in measuring a physical quantity if we define the ratio of the Hankel functions at particular receiver radii $r_1$ and $r_2$ as $$\frac{H_0^{(1)}(kr_1)}{H_0^{(2)}(kr_2)} = \rho(\omega) e^{i\theta(\omega)} \quad (11)$$

where the functions $\rho(\omega)$ and $\theta(\omega)$ are the amplitude and phase respectively of the ratio of the complex Hankel functions. This quantity is constant and known for a particular frequency and hence, may be precomputed and stored, for example, as a voltage level, for later use in calculating the reflection coefficients.

In terms of quantities which may be observed at the surface of two transducers of different radii inside the casing, the amplitude and the phase of reflected acoustic waves may be observed. These quantities will be denoted by $\rho_{1i}$ and $\phi_{1i}$ respectively. Thus, by using the relationship of Equation (11), the more complex Equation (10) may be brought into the more usable form for the magnitude of the reflection coefficient $|Q|$ as $$|Q| = \left[\frac{[\rho_1 - \rho_2\rho \cos(\theta + \phi_2 - \phi_1)]^2 + [\rho_2\rho \sin(\theta + \phi_2 - \phi_1)]^2}{[\rho_1 - \rho_2\rho \cos(\theta + \phi_1 - \phi_2)]^2 + [\rho_2\rho \sin(\theta + \phi_1 - \phi_2)]^2}\right]^{1/2} \quad (12)$$

Here the $i$ subscript has been dropped for brevity of expression but it should be understood that Equation (12) and the succeeding equations apply equally well to segmented receiver transducers having $i$ segments.

Suitable algebraic manipulation of Equation (12) can be made to yield an expression for $|Q|$ in terms of the relative amplitudes $\rho_1/\rho_2 = R$ and phases $\phi = \phi_2 - \phi_1$ of the reflected waves at the transducer boundaries. This yields:

$$|Q| = \left[\frac{\frac{R}{\rho} + \frac{\rho}{R} - 2\cos(\theta + \phi)}{\frac{R}{\rho} + \frac{\rho}{R} - 2\cos(\theta - \phi)}\right]^{1/2} \quad (13)$$

The quantities $R$ and $\phi$ defined above are the relative amplitude and phase at the two receivers of radii $r_1$ and $r_2$ and, if measured, can be combined as indicated in Equation (13) to give the acoustic reflection coefficient at a particular frequency (recalling that $\rho$ and $\theta$ are known for each frequency once the receiver radii are specified). Thus, a plurality of measurements of $R$ and $\phi$ may be made at different frequencies over the spectrum of acoustic energy used to excite the formation and, with appropriate processing, these would yield logs similar to the graphs of FIGS. 3, 4 and 5 which may be used to interpret the cement conditions behind the casing. The apparatus to be described is intended to provide just such measurements and computations, enabling the production of reflection coefficient curves for this purpose.

Figures 6, 7:
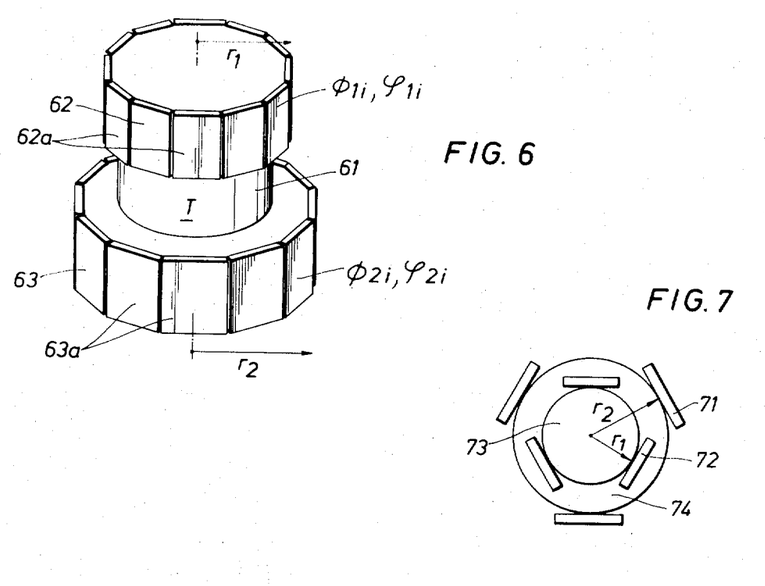
FIG. 6 is a perspective view showing the biradially mounted receiving transducers used in a zero spacing configuration in the present invention along with an acoustic transmitting transducer.
FIG. 7 is a top view showing the biradially mounted segmented receiver pairs of the present invention together with their absorbent acoustic backing material.

Referring now to FIG. 6, a transducer configuration to obtain a reflection coefficient log in accordance with the present invention is shown schematically. A hollow cylindrical piezoelectric transmitting transducer 61 of conventional design may be used to produce the acoustic energy used to excite the system. Just above and below the transmitting transducer 61 in a "zero spacing" arrangement are placed acoustic receivers 62 and 63 which may also use conventional piezoelectric materials to sense impinging reflected acoustic energy and produce an electrical output representative thereof. Receivers 62 and 63, it should be noted, are of different radii $r_1$ and $r_2$ and are comprised of a plurality of planar angular segments of piezoelectric material 62a and 63a assembled into a roughly cylindrical shape. Alternatively receiver segments 62a 63a could be of an arcuate shape, even more closely approximating a cylindrical surface.

As may be more readily appreciated in the top view of the receiving transducer assembly (with some segments omitted for clarity) shown in FIG. 7, the individual angular segments of the receiving transducers are arranged about a cylindrical backing of acoustic absorbent base material 73 and 74. For example, the angular segments 72 of the receiving transducer having the smaller radius $r_1$ may be cemented or otherwise conveniently mounted about the exterior surface of a cylindrical shaped piece of acoustic absorbent material such as that marketed under the trade name MINK–2000 which is available from the Johns-Manville Corporation. Similarly angular receiver segments 71 of the larger receiving array can be mounted about the exterior of another cylindrical shaped piece of acoustic absorbent material 74. It should be noted that both receivers 62 and 63 have the same number of angular segments in a one-to-one relationship. These may be referred to as paired receiver segments. This enables the relative amplitude $\rho_1/\rho_2$ and the relative phase $\phi_1 - \phi_2$ over the same angular arc of the borehole to be observed by the corresponding paired receiver segments of each receiver array. Since the receivers are backed by an acoustically absorbent material, each receiver segment, to a good approximation, sees only acoustic energy reflected from the angular portion of the borehole-casing-formation system which is directly in front of it. This type of mounting of paired receiver segments on two cylinders of different radii will henceforth be referred to as biradial mounting of the receiver segment pairs.

Figures 8, 12:
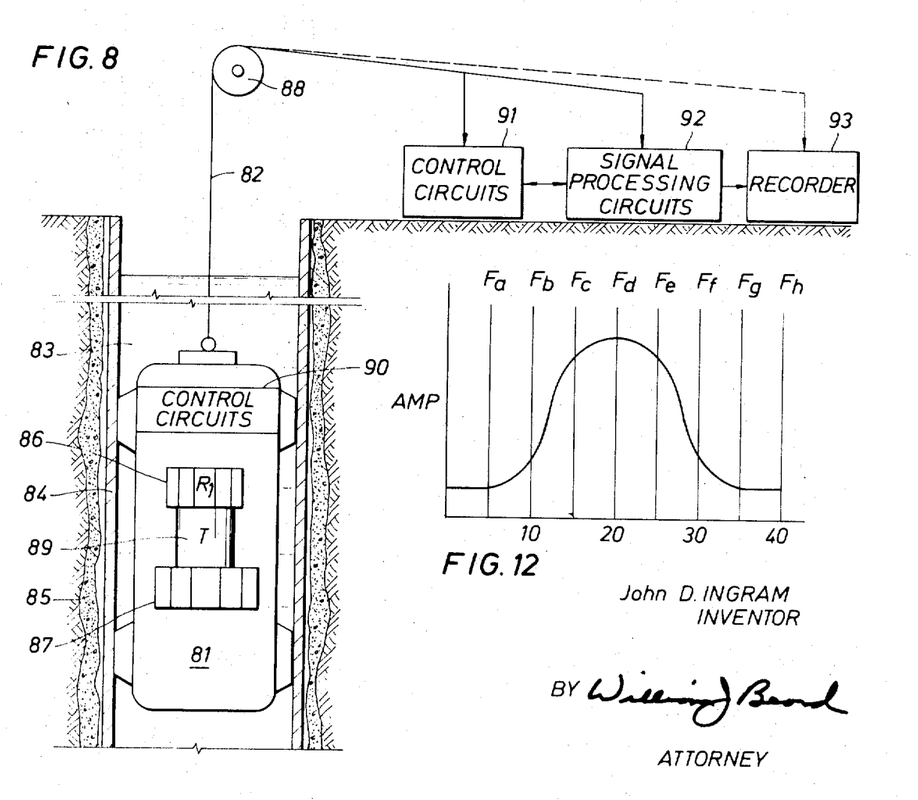
FIG. 8 is a schematic illustration showing the well logging tool of the present invention suspended in a well bore.
FIG. 12 shows the frequency response of a typical acoustic logging transducer with the plurality of narrow bandpass filters of the present invention superimposed upon it.

FIG. 8 shows an acoustic well logging tool 81 in accordance with the principles of the present invention suspended from a winch arrangement 88, as well known in the art, by a multiconductor cable 82 in a fluid-filled well bore 83. Well bore 83 has been lined with casing 84, cemented in place by a cement layer 85 whose condition is to be determined by means of obtaining acoustic reflection coefficient logs as previously described. It will be understood that cable 82 contains all necessary conductors for providing power and control signals to the downhole tool 81 and additionally provides a communication path to the surface equipment for electrical signals representative of acoustic energy received by the receiving transducers 86 and 87 of the downhole tool.

Logging tool 81 contains an acoustic transmitter 89 and a pair of segmented biradially mounted acoustic receivers 86 and 87 as just described. While only one such transducer array is shown it will be understood that a plurality of such arrays may be used if desired, in order to utilize the same logging tool for other measurements such as acoustic travel time or attenuation logs. The upper portion of tool 81 houses appropriate control circuitry 90 which, in conjunction with surface control circuits 91, operate to control the measuring sequence for obtaining the reflection coefficient logs. These circuits act generally, as will be described in more detail subsequently, to fire the acoustic transmitter 89 and then to sample the resulting outputs from the biradially mounted, segmented receiver pairs. The receiver pair outputs are sampled over the same time interval following the transmitter firing but are sequentially transmitted to the surface for processing by the signal processing circuits.

Figure 9:
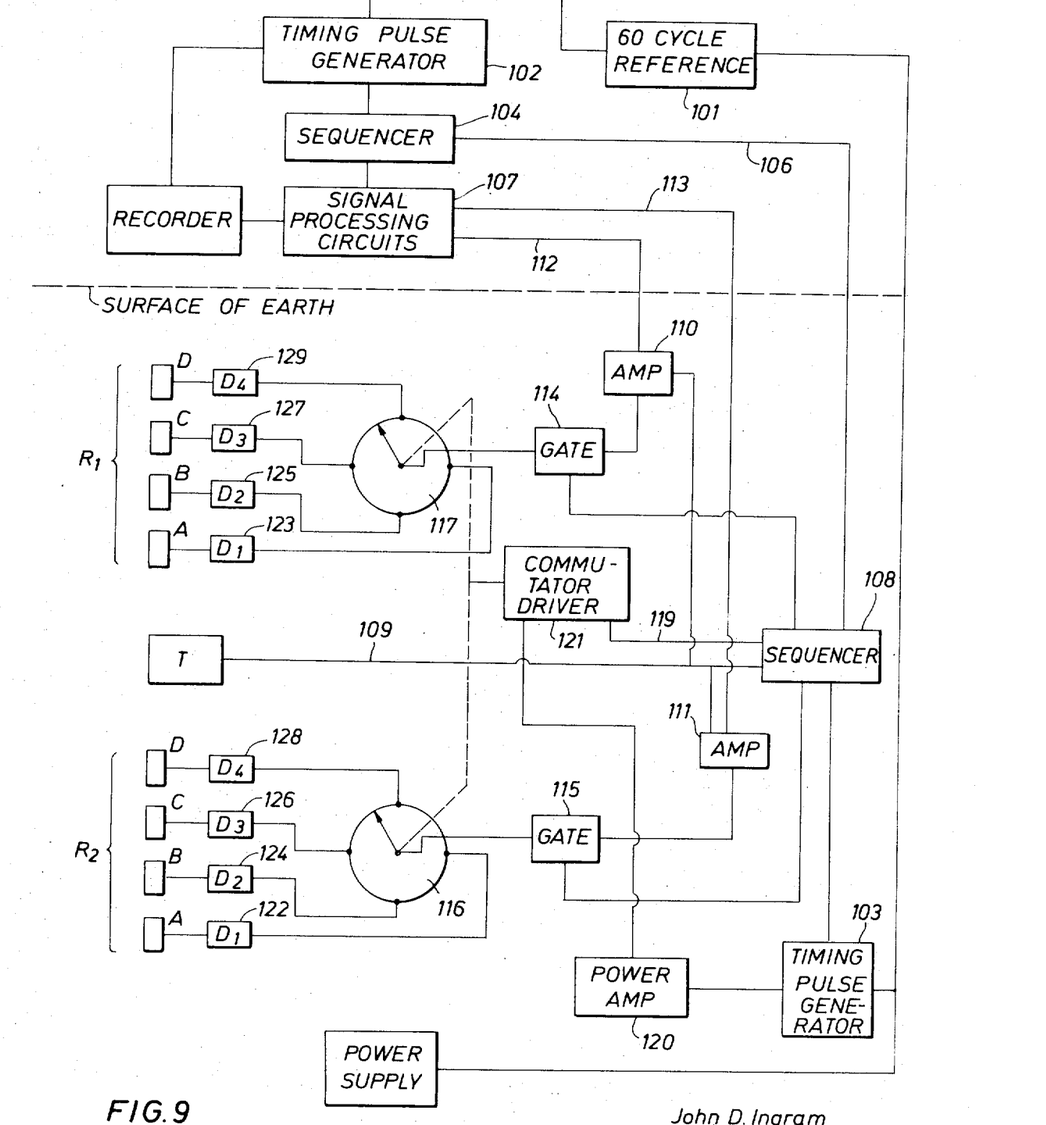
FIG. 9 is a block diagram showing the circuitry of the logging system of the present invention.

This may be more readily appreciated by reference to FIG. 9 which shows a block diagram of the control circuitry. As sequential processing of signals at the surface and downhole is involved, it will be appreciated that synchronization of the process must be established. Such synchronization is supplied by the 60 per second AC power line reference frequency 101 which is accurate and readily available. By using a common reference frequency both downhole and on the surface and generating timing pulses at the surface and in the downhole tool based on submultiples such as one-half, one-third or any other desired fraction of the reference frequency, the synchronization is achieved. Timing pulse generators 102 and 103 which may be of the type shown in more detail in U.S. Pat. No. 3,304,537 may be utilized for this purpose.

In order to provide a smooth and continuous appearing log it is desirable to operate the acoustic transmitter in a pulsed mode of operation using as high a repetition frequency as possible. For example, a transmitter firing frequency of 10 times per second could provide this effect satisfactorily, thus giving a measurement cycle of 100 milliseconds duration. The uphole sequencer 104 provides a reset pulse every 100 milliseconds on line 106 to start the measuring sequence in the downhole tool. This pulse is also used to reset all circuits in the signal processing circuits 107 to enable a new series of computations for the new measurement cycle to be begun in the uphole signal processing circuitry.

Upon receipt of the reset pulse, the downhole sequencing circuit 108, after an appropriate delay, generates a transmitter fire pulse on line 109 which is used to fire the acoustic transmitter T in a conventional manner. Additionally, the transmitter fire pulse is routed to amplifiers 110 and 111 where it goes immediately to the surface on both uplink conductors 112 and 113. This pulse is used to control the signal inputs from the downhole tool to the signal processing circuits as will be subsequently described. Once the transmitter is fired, a brief delay is desirable before activating the receivers in order to allow any "ringing" or resonance of the transmitter to damp out. The sequencer 108 provides this delay by not supplying conditioning pulses to signal gates 114 and 115 until after the desired delay time has elapsed. Signal gates 114 and 115 will permit no signals from the commutators 116 and 117 to enter amplifiers 110 and 111 for transmission to the surface until conditioned by the sequencer conditioning pulses just mentioned.

At the same time that the signal gates 114 and 115 are conditioned, the sequencer 108 also supplies a pulse on line 119 to enable the commutator driver 121 to receive power from power amplifier 120 to start the commutators 116 and 117. Power amplifier 120 amplifies the timing pulses provided by the timing pulse generator 103 to power the commutator driver 121 which may be a synchronous motor or the like. Since the commutator driver 121 is powered in this manner its synchronization with the remainder of the system is assured.

Once the commutator is started, the sampling of reflected acoustic signals impinging on the two receiver arrays $R_1$ and $R_2$ is begun. Paired biradially mounted receiver segments of $R_1$ and $R_2$ are sampled simultaneously by the action of ganged commutators 116 and 117. Although only four pairs of receiver segments are shown for simplicity, it will be understood that as many pairs as desired may be used.

Each pair of corresponding receiver segment outputs are delayed by the same amount and appear at their appropriate commutator contacts for amplification and transmission to the surface simultaneously. For example, delay lines 122 and 123 which delay the outputs of paired biradially mounted receiver segments $R_{1A}$ and $R_{2A}$ each have the same delay time, denoted by $D_1$. Thus, the ganged commutators 116 and 117 sample outputs of $R_{1A}$ and $R_{2A}$ which occurred over the same time period. The delay times $D_1$, $D_2$, $D_3$ and $D_4$ provided by the respective delay lines are so arranged as to make the signals appearing at the commutator inputs when the commutator wiper is there to sample them, all have the same origin in time. That is to say, the delay provided by delay lines 124 and 125, (i.e., $D_2$) is equal to $D_1$ plus the time it takes the commutator to move from the contacts sampling the inputs from paired segments A to the contacts sampling the inputs from paired segments B of the receivers $R_1$ and $R_2$. The result of this is to produce a sequence of receiver outputs on the uplink lines 112 and 113 such as those appearing in FIG. 11.

Figure 11:
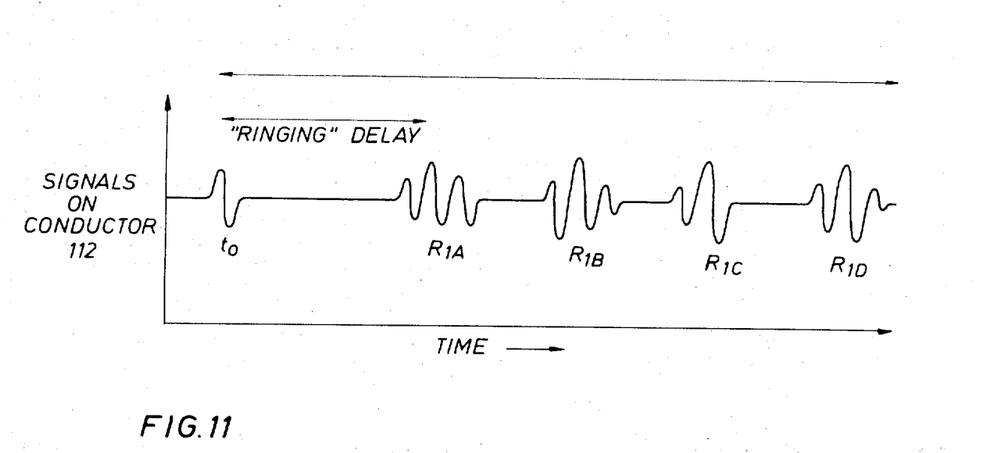
FIG. 11 is a schematic timing diagram showing the sequence of acoustic signals arriving at the surface signal processing circuits.

In FIG. 11, the signals appearing on the uplink line 112 is illustrated. At the beginning of the measurement cycle the $t_o$ or transmitter fire pulse is generated as previously described and appears first on the uplink. After the "ringing" delay, the output of one of the paired biradially mounted receiver segments, say $R_{1A}$ appears, followed sequentially in time by the outputs of paired segments $R_{1B}$, $R_{1C}$ and $R_{1D}$. All of these receiver outputs have the same origin in time, as previously discussed, but appear sequentially on the uplink lines 112 and 113 for processing by the surface signal processing circuits.

Figure 10:
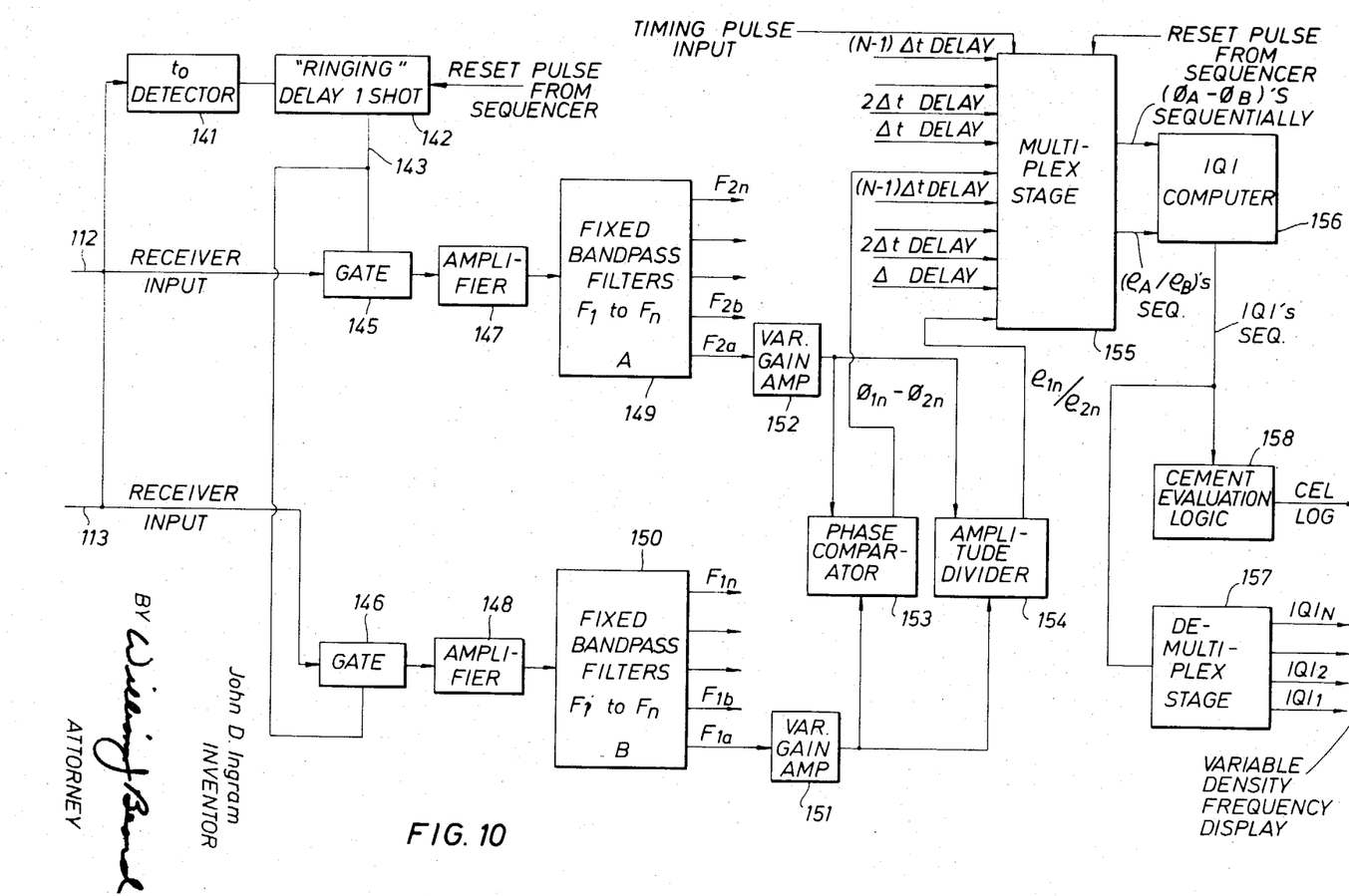
FIG. 10 is a block diagram showing the surface signal processing circuitry of the present invention.

Referring now to FIG. 10, the operation of the surface signal processing circuits may be more readily appreciated. Recalling the sequence of sonic receiver signals from the downhole tool coming to the surface on uplink lines 112 and 113, the transmitter fire, or $t_o$ signal which precedes the receiver signals is used to condition the surface signal processing circuits for the computational cycle. A $t_o$ detector 141 detects the arrival of the $t_o$ pulses on both lines 112 and 113 and when both are detected produces an output pulse to the "ringing" delay one-shot 142. Detection of the $t_o$ pulse on both lines provides a measure of redundancy to the system for insuring that all downhole circuits are properly functioning. Delay one-shot 142 upon receipt of the $t_o$ detect pulse is in its zero output or reset condition due to its prior receipt of the reset pulse from the sequencer 104 of FIG. 9 as previously discussed. When the $t_o$ detect pulse arrives, delay one-shot 142 delays for a period sufficient for the transmitter "ringing" to die out and then produces an output pulse on line 143 to condition signal input gates 145 and 146 to permit entry of the receiver signals into the signal processing circuits. The output of delay one-shot 142 continues (i.e., gates 145 and 146 remain open) until the delay one-shot 142 receives a reset pulse from the sequencer 104 at the end of the computation cycle. By keeping the signal input gates closed during the firing of transmitter and between computational cycles, the possibility of noise or spurious "cross-talk" signals entering the system is minimized.

Upon entry into the signal processing circuits the sequentially arriving paired receiver signals are amplified by amplifiers 147 and 148 and then input into two circuits 149 and 150 each consisting of a plurality of relatively narrow bandwidth fixed bandpass frequency filters (referred to hereafter as filter "banks"). These bandpass filters break up the paired receiver inputs into a plurality of discrete frequency components which are sequentially processed as will be described subsequently in order to compute the reflection coefficient $Q$ in the range of each of the bandpsss filters. Each bandpass filter in the group may have, for example, a half power bandwidth of 3KHz, and enough of the filters are utilized to cover the frequency range of interest for logging $Q$. For example, 20 such filters would cover the range from 0 to 60KHz, in successive 3KHz bands. Thus, it may be said that the bandpass filters 149 and 150 perform a Fourier analysis of the input waveforms of the paired receiver segments arriving on the input lines 112 and 113, breaking them up into a plurality of discrete frequency components $F_{1a}$ to $F_{1n}$ and $F_{2a}$ to $F_{2n}$ as illustrated in FIG. 10.

Recalling that an individual frequency component of the signal may be thought of as the product of an amplitude times a phase factor [i.e., $F(\omega) = \rho^{i\phi}$] the next step in the signal processing is to extract the amplitude and phase information from the discrete frequency components comprising the outputs of the bandpass filter banks 149 and 150. In discussing the further signal processing it should be noted that each bank of bandpass filters 149 and 150 produces a plurality of outputs. For ease of discussion only one pair of outputs (those labeled $F_{1a}$ and $F_{2a}$ in FIG. 10) will be described. It will be understood that the remaining outputs $F_{1b}$ to $F_{1n}$ and $F_{2b}$ to $F_{2n}$ are processed in the same manner.

Before the amplitude and phase data can be separated from the filter outputs, any distortion due to the frequency response of the receiving transducers must be removed. This function is performed by variable gain amplifiers 151 and 152. This concept may be more readily appreciated by reference to FIG. 12 which illustrates the frequency response of a typical piezoelectric receiving transducer to a constant amplitude signal swept across the frequency spectrum. The passbands of a plurality of bandpass filters $F_a$ to $F_h$ are shown superimposed on this response curve. It will be noted that such a transducer is considerably more sensitive in the frequency region of filters $F_d$ and $F_e$, say, in the region of filters $F_b$ or $F_g$. Thus, the outputs of filters $F_b$ or $F_g$ would be amplified by their associated variable gain amplifiers, corresponding to variable gain amplifiers 151 and 152 more than the outputs of filters $F_d$ and $F_e$. Once the frequency response of the receiving transducers is known and the bandwidth and center frequency of the filters is established, the gain of variable amplifiers 151 and 152 and their corresponding components in the outputs of the other filters may be adjusted to perform this connection. Such a process may be referred to as normalizing the outputs of the filters.

In order to extract the relative phase factor $\phi_{2a} - \phi_{1a}$ and the relative amplitude ratio $\rho_{2a}/\rho_{1a}$ which are needed to compute the reflection coefficient $Q$ in a particular frequency band, the normalized outputs of the variable gain amplifiers 151 and 152 are input to a phase comparator circuit 153 and an amplitude divider circuit 154. Phase comparator circuit 153, which may be a phase detector such as a discriminator circuit or the like, produces an output voltage which is proportional to the phase difference $\phi_{2a} - \phi_{1a}$ of its two inputs. The amplitude divider circuit 154 furnishes an output voltage which is proportional to the amplitude ratio of its two inputs $\rho_{2a}/\rho_{1a}$. Similarly, the normalized outputs of each of the paired receiver segment signals from the remainder of the bandpass filters $F_{2b}$ to $F_{2n}$ and $F_{1b}$ to $F_{1n}$ are input to corresponding phase comparators and amplitude divider circuits (not shown) which extract the corresponding relative phase ($\phi_{2n} - \phi_{1n}$), and amplitude ratio ($\rho_{2n}/\rho_{1n}$), data.

The outputs of the plurality of phase comparators and amplitude dividers for each pair of matching bandpass filters in filter banks 149 and 150 are input to a multiplex stage 155. Mutliplex stage 155 functions to delay for variable intervals the outputs of the phase comparators and amplitude dividers and to present these phase differences, $\phi_{2a} - \phi_{1a}$ to $\phi_{2n} - \phi_{1n}$ and amplitude ratios $\rho_{2a}/\rho_{1a}$ to $\rho_{2n}/\rho_{1n}$, sequentially as inputs to the reflection coefficient computer 156 so that the computer can calculate the reflection coefficients for each of the filter bands $F_a$ to $F_n$. To this end timing pulses are presented to the multiplex stage from the timing pulse generator 102 of FIG. 9. A plurality of delay lines (not shown) in the multiplex stage could, for example, be gated sequentially by a plurality of gates conditioned from a counter (not shown) operated by the timing pulses input to the multiplex stage. The multiplex stage could then, as the counter reached a certain threshold count for a particular filter pair, say $F_{1b}$ and $F_{2b}$, gate the corresponding phase difference and amplitude ratio for this filter pair into the reflection coefficient computer. This process would be repeated for each filter pair $F_{1n}$ and $F_{2n}$ until all pairs were finished. The counter could then be recycled to operate on the filter outputs from the next receiver segment signals which would be arriving on the uplink input lines.

The reflection coefficient computer 156 receives the relative phase differences $\phi_{2n} - \phi_{1n} = \phi_n$ and $\rho_{2n}/\rho_{1n} = R_n$ and uses these in Equation (13) to compute the corresponding reflection coefficient $Q$ for the particular frequency band in question. It will be recalled from Equation (11) that the constants $\rho$ and $\theta$ of Equation (13) are known for a particular frequency once the radii $r_1$ and $r_2$ of the two receiver segments are known. Hence, all the quantities on the right hand side of Equation (13) are known and the computer 156 performs the indicated operations of Equation (13) to compute the magnitude of the reflection coefficient $Q$. It should be noted that in using this technique to compute the reflection coefficients $|Q|$ that no mathematical approximations have been made. Thus, the computed output of the reflection coefficient computer is exactly the cylindrical reflection coefficient.

The reflection coefficients $Q_1$ to $Q_n$ for a particular pair of biradially mounted receiver segments are thus sequentially output from computer 156. The sequentially output $Q$'s may then be routed to a de-multiplex stage 157 for display purposes. De-multiplex stage 157 performs the inverse function of the multiplex stage 155. That is to say, the de-multiplex stage 157 takes the sequentially arriving $Q$'s and delays them by varying amounts so as to output all the $Q$'s for the spectrum of a particular receiver simultaneously. This enables a multi-channel display device to display the reflection coefficient frequency spectrum of a particular receiver segment pair.

For example, a cathode ray tube variable density display could be made of the reflection coefficient spectrum as a function or borehole depth for each of the paired receiver segments of the receiving transducers in the downhole tool. If there were three such pairs of receiving transducers then three channels on the display would be required. These three channels could be placed side by side on the recording medium in the manner shown in FIG. 13. Interpretation of the reflection coefficient spectra of the different receiver pairs would then yield valuable information as to the cement conditions in each of the four quadrants of the borehole in front of each pair of biradially mounted receiver segments.

Alternatively, the sequential $Q_n$ output of the reflection coefficient computer could be routed to cement evaluation logic circuitry 158 which could be similar to that disclosed in the above-mentioned copending Beil application. The cement evaluation logic circuitry could then perform a logical analysis of the reflection coefficient spectra and output a single cement evaluation log as a function of borehole depth.

Figure 13:
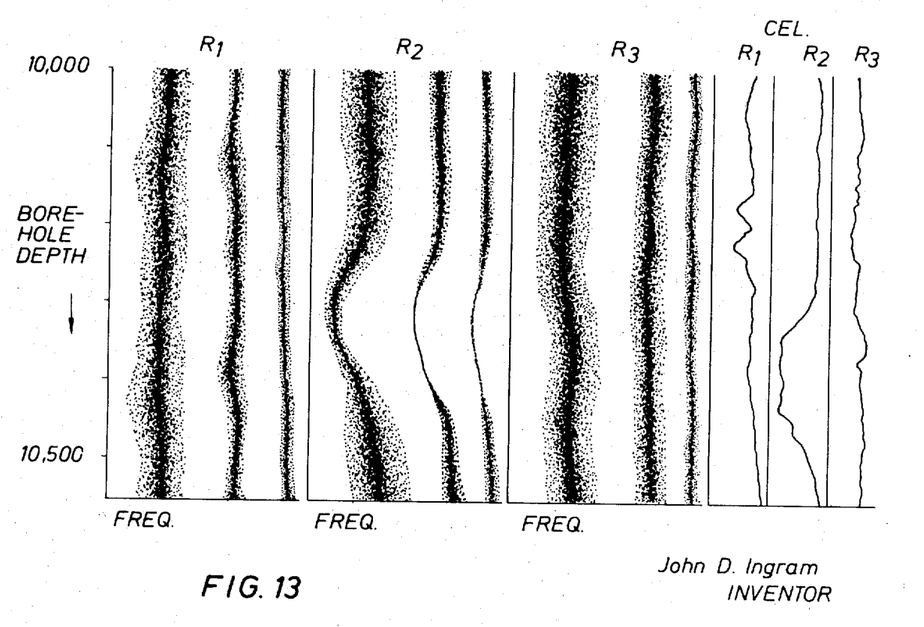
FIG. 13 is a schematic representation showing a possible well log format which could be used with the methods and apparatus of the present invention.

Referring now to FIG. 13, one format for displaying the reflection coefficient log as a function of borehole depth is illustrated schematically. In the illustration of FIG. 13 a cathode ray tube variable density display for three segmented biradially mounted receiver pairs labeled $R_1$, $R_2$ and $R_3$ is shown on the left-hand side of the log while on the right-hand side a cement evaluation log for each of the three receiver pairs is displayed. The cement evaluation log could be, as previously discussed, the result of applying cement evaluation logic by a computer 158 of FIG. 10 to the reflection coefficient data. The result of this logic would be to produce a single trace as a function of borehole depth of the cement quality or effectiveness for each receiver pair. This curve could range between 0 and 100 percent cement effectiveness or the like.

The variable density cathode ray tube display on the left illustrates the inverse of the magnitude of the reflection coefficients seen by each receiver pair as a function of frequency, the frequency increasing to the right of the illustration. The cathode ray tube beam in such a display is intensity modulated in proportion to the magnitude of the displayed quantity. The schematic display shown, for example, might be representative of a reflection coefficient spectra such as that shown in FIG. 3. The darker areas of the display would correspond to the reflection coefficient minima 31, 32 and 33 of FIG. 3 at the frequencies indicated. A display such as that shown in FIG. 13 has the advantage of showing simultaneously the reflection coefficient spectrum and cement evaluation log for each receiver pair used. It will be recalled that each receiver pair to a good approximation only sees that portion of the borehole-casing-annulus-formation system which is directly in front of it because of its acoustically absorbent mounting. Thus, a display such as that of FIG. 13 gives a complete picture of cement conditions in the angular arc of the case borehole before each receiver. While only three such displays are shown in FIG. 13, it will, of course, be appreciated by those skilled in the art that as many such segmented receiver pairs could be used as desired to give finer resolution of the angular disposition of the cement, if desired.

Other alternative ways of processing the reflection coefficient data will be apparent to those skilled in the art. For example, the reflection coefficient data could be recorded on magnetic tape and processed at a remote site by a general purpose digital computer. Or, if a small general purpose digital computer were available at the well site, it could be used to accept the outputs of the multiplex stage 155 and could compute the reflection coefficient data internally and either display it as a multi-channel variable density display as previously discussed or apply cement evaluation logic and display a cement evaluation log. These and other alternatives such as magnetic tape recording the multiplex stage outputs for later processing, or recording the raw sequential receiver segment waveforms for remote processing in a manner analogous to that of the apparatus disclosed are all considered to be within the scope of the invention.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method of acoustically logging a well bore to provide a frequency spectrum of the acoustic reflection coefficient comprising the steps of:
   transmitting a component of acoustic energy radially outwardly from the borehole into the cement and surrounding formations;
   receiving a reflected portion of the transmitted acoustic energy at two different radii in the borehole and generating first and second electrical signals representative thereof;
   passing said first and second signals through $n$, where $n$ is an integer number, relatively narrow bandpass filters having different center frequencies spaced over the acoustic spectrum to provide $n$ pairs of corresponding frequency components for said first and second signals;
   generating third electrical signals representative of the relative phase of each of said $n$ pairs of corresponding frequency components;
   generating fourth electrical signals representative of the relative amplitudes of each of said $n$ pairs of corresponding frequency components; and
   combining said third and fourth signals to generate $n$ signals representative of the acoustic reflection coefficient for each of the $n$ frequency components, thereby providing a frequency spectrum of acoustic reflection coefficients.

2. The method of claim 1 and further including the step of recording said $n$ signals representative of the acoustic reflection coefficient for each of the $n$ frequency components.

3. The method of claim 1 wherein the steps are performed periodically while moving a logging tool vertically through the well bore and the frequency spectrum of acoustic reflection coefficients is recorded as a function of borehole depth at each level traversed by the logging tool.

4. A method of acoustically logging a well bore to provide a frequency spectrum of the acoustic reflection coefficient comprising the steps of:
   transmitting a component of acoustic energy radially outwardly from the borehole into the cement and surrounding formations;
   receiving a reflected portion of the transmitted acoustic energy at a pair of biradially mounted acoustic receivers, each having $l$ angular segments, where $l$ is an integer number 2 or greater, and generating $l$ pairs of electrical signals representative of the received acoustic energy at each corresponding pair of receiver segments;
   passing each of said $l$ pairs of corresponding signals through $n$, where $n$ is an integer number, relatively narrow bandpass filters having different center frequencies spaced over the acoustic spectrum to provide $n$ pairs of corresponding frequency components for each of the $l$ corresponding receiver segment pairs;
   generating electrical signals representative of the relative phase of each of said $n$ pairs of corresponding frequency components for each of said $l$ corresponding receiver segment pairs;
   generating electrical signals representative of the relative amplitudes of each of said $n$ pairs of corresponding frequency components for each of said $l$ corresponding receiver segment pairs; and
   combining said relative phase and relative amplitude signals for each of said $n$ pairs of corresponding frequency components for each of said $l$ corresponding receiver segment pairs to generate $n$ signals representative of the acoustic reflection coefficient for each of the $n$ frequency components thereby providing $l$ frequency spectra of acoustic reflection coefficients corresponding to the reflection coefficient spectrum of each of the $l$ angular segments of the biradially mounted acoustic receivers.

5. The method of claim 4 and further including the step of recording said $n$ signals representative of the acoustic reflection coefficients for each of the $n$ frequency components and so doing for each of the $l$ frequency spectra of acoustic reflection coefficients corresponding to the reflection coefficient spectrum of each of the $l$ angular segments of the biradially mounted acoustic receivers.

6. The method of claim 4 wherein the steps are performed periodically while moving a logging tool through the well bore and the resulting $l$ frequency spectra of acoustic reflection coefficients are recorded as a function of borehole depth at each level traversed by the logging tool.

7. A method for acoustically logging a cased borehole to determine the effectiveness of the cement disposed in the annulus between the casing and the formations comprising the steps of:
   moving an acoustic well logging tool having at least one acoustic transmitter and at least two acoustic receivers of different radii through the well bore;
   periodically firing said acoustic transmitter to propagate a component of acoustic energy radially outwardly from the borehole into the cement and surrounding formations;
   periodically activating said acoustic receivers in response to said transmitter firing to receive a reflected portion of the transmitted acoustic energy at, at least two different radii in the borehole and generating a plurality of electrical signals representative of said reflected portion of acoustic energy;
   separating each of said representative electrical signals into a plurality of signals representative of discrete frequency components, the frequency components of each representative signal being in a one-to-one correspondence with each other;
   generating electrical signals representative of the relative phases of corresponding pairs of said frequency component signals;
   generating electrical signals representative of the relative amplitudes of corresponding pairs of said frequency component signals; and
   combining said relative phase signals and said relative amplitude signals for each of the corresponding pairs of said frequency component signals to generate signals representative of the acoustic reflection coefficient in the frequency region of each of said discrete frequency components.

8. The method of claim 7 and further including the step of recording as a function of the borehole depth of said logging tool, said signals representative of the acoustic reflection coefficient in the frequency region of each of said discrete frequency components.

9. The method of claim 7 wherein the step of breaking each of said representative electrical signals down into a plurality of signals representative of discrete frequency components is performed by applying each of said representative signals to a plurality of relatively narrow bandpass frequency filters having different center frequencies disposed over a selected portion of the acoustic spectrum.

10. The method of claim 7 wherein said acoustic receivers are angularly segmented and have receiver segment pairs in one to one correspondence with each other, each corresponding receiver segment pair disposed adjacent the same angular arc of the borehole and the remaining method steps pertaining to the signal processing are each performed on the representative signals generated by each corresponding receiver segment pair, thereby providing an independent frequency spectrum of acoustic reflection coefficients for each angular arc of the borehole.

11. The method of claim 7 and further including the step of correcting said signals representative of discrete frequency components of the representative signals for any amplitude distortion introduced by the frequency response of the acoustic receivers by amplifying each signal representative of a discrete frequency component by an amount inversely proportional to the sensitivity of the acoustic receiver in the frequency region said signal represents.

12. A method of acoustically logging a cased borehole with a longitudinally extending exploring device to provide a plurality of frequency spectra of acoustic reflection coefficients comprising the steps of:
transmitting a component of acoustic energy radially outwardly from the exploring device into the cement and surrounding formations;
receiving a reflected portion of the transmitted acoustic energy at two different positions within the borehole which are at two positions having different radii relative to the central axis of the exploring device and generating first and second electrical signals representative thereof;
separating said first and second signals into a plurality of corresponding pairs of frequency component signals; and
determining from said plurality of corresponding pairs of frequency component signals, the plurality of acoustic reflection coefficients corresponding to each of the pairs of frequency component signals, and generating signals representative thereof.

13. The method of claim 12 and further including the step of recording said plurality signals representative of the acoustic reflection coefficient corresponding to each of the frequency component signals.

14. The method of claim 12 wherein the steps are performed periodically as a well tool is moved through the borehole and the signals are recorded as a function of borehole depth.

15. Apparatus for acoustically logging a cased well bore to provide an acoustic reflection coefficient spectrum comprising:
an acoustic well logging tool having at least one acoustic transmitter and at least two acoustic receivers of different radii;
means for periodically firing said transmitter to propagate a component of acoustic energy radially outwardly from the borehole into the cement and surrounding formations;
means for periodically activating said acoustic receivers in response to said transmitter firings to receive a reflected portion of the transmitted energy at said different radii and to generate a plurality of electrical signals representative thereof;
means for separating said plurality of representative electrical signals into a plurality of signals representative of discrete frequency components of said signals, said frequency components being in a one-to-one correspondence with each other;
means for generating electrical signals representative of the relative phases of corresponding pairs of said frequency component signals;
means for generating electrical signals representative of the relative amplitudes of corresponding pairs of said frequency component signals; and
means for combining said relative phase signals and said relative amplitude signals to generate signals representative of the acoustic reflection coefficient in the frequency region of each of said discrete frequency components.

16. The apparatus of claim 15 wherein said means for separating said plurality of representative electrical signals into signals representative of discrete frequency components includes a plurality of relatively narrow bandpass filters having different center frequencies disposed over a selected portion of the acoustic spectrum.

17. The apparatus of claim 15 wherein said means for generating signals representative of the relative phases of corresponding pairs of said frequency component signals includes phase comparator means for comparing the phases of said signals and means for generating an output signal representative of the difference of the phases of said signals.

18. The apparatus of claim 15 wherein said means for generating electrical signals representative of the relative amplitudes of corresponding pairs of said frequency component signals includes means for comparing the ratio of the amplitudes of said signals and means for generating an output signal representative of said amplitude ratio.

19. The apparatus of claim 15 wherein said means for combining said relative phase and said relative amplitude signals includes means for combining a signal representative of the difference of the phases of said signals and the ratio of said amplitudes, together with means for generating signals representative of the acoustic reflection coefficient derived from the phase difference and amplitude ratio signals.

20. Acoustic apparatus for logging a well bore to provide acoustic reflection coefficient logs of the well bore comprising:
acoustic transmitting transducer means;
first piezoelectric acoustic receiver means of a hollow cylindrical shape having a radius $r_1$;

second piezoelectric acoustic receiver means of a hollow cylindrical shape having a radius $r_2$ different from $r_1$ and electrically distinct from said first acoustic receiver; and means adapted for repetitively energizing said transmitting transducer means and producing separate electrical signals from said first and second receiver means for use in producing acoustic reflection coefficient logs.

21. The apparatus of claim 20 wherein both of said acoustic receiver means are mounted on the exterior surface of plural cylinders of acoustic absorbent material.

22. The apparatus of claim 21 wherein both of said acoustic receiver means are divided into $n$, where $n$ is an integer number 2 or greater, corresponding angular segments, whereby each of the $n$ corresponding receiver segment pairs receive reflected acoustic energy from the angular portion of the borehole in front of the receiver segment pairs.

23. The apparatus of claim 20 wherein said first and second receiver means are disposed along the longitudinal axis of the transducer array on either side of the transmitting transducer in a zero spacing arrangement.

24. Apparatus for acoustically logging a cased well borehole to determine the effectiveness of cement disposed in the annulus between the casing and the formation comprising:

means for transmitting a component of acoustic energy radially outwardly from the borehole into the cement and surrounding formations;

means for receiving a reflected portion of the transmitted acoustic energy at two different radial positions in the borehole and generating electrical signals representative thereof;

means for performing a Fourier analysis of said first and second electrical signals to separate said signals into a plurality of corresponding pairs of frequency component signals; and means responsive to said plurality of corresponding pairs of frequency component signals for determining the plurality of acoustic reflection coefficients corresponding to said frequency component signals and generating signals representative thereof.

25. The apparatus of claim 24 and further including means for recording as a function of borehole depth said signals representative of the acoustic reflection coefficients corresponding to said pairs of frequency component signals.

* * * * *